INVENTOR
JOSEPH C. MORIN

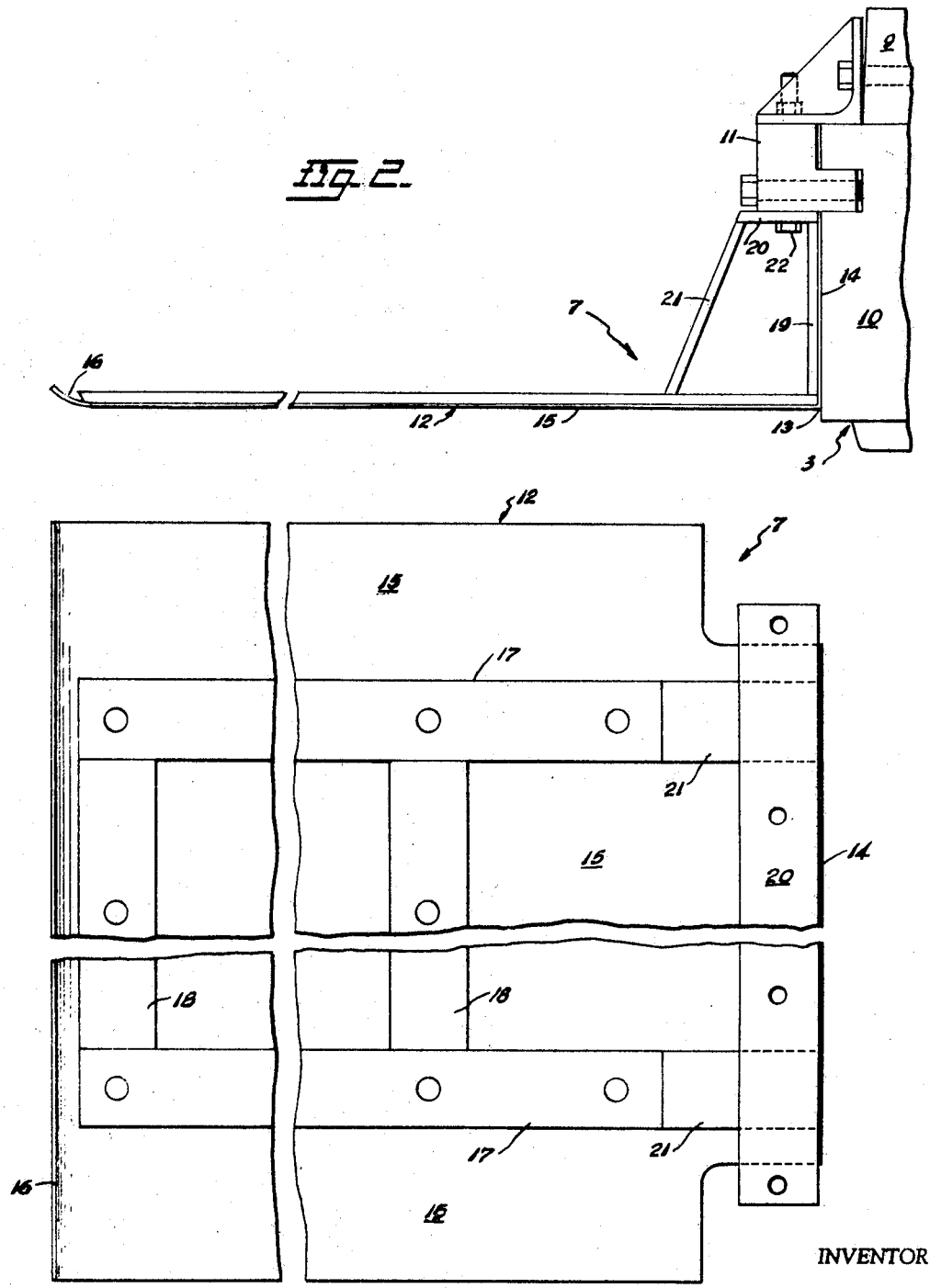

United States Patent Office 3,473,195
Patented Oct. 21, 1969

3,473,195
THERMOFORMING APPARATUS
Joseph C. Morin, Edmonton, Alberta, Canada, assignor to Cupples Container Company, St. Louis, Mo., a corporation of Missouri
Filed Feb. 26, 1968, Ser. No. 708,329
Int. Cl. B29c 17/00
U.S. Cl. 18—19                                    5 Claims

ABSTRACT OF THE DISCLOSURE

Improvements in thermoforming apparatus of the type in which a web of thermoplastic material to be thermoformed is fed continuously and the mold unit is movably mounted, being driven with the web when the molds are closed, and returned to its starting point as soon as the molds are opened. In such apparatus, the web passes through a stationary heating zone as it approaches the molding station. Hence, in prior-art machines, a next-to-be-molded portion of the web was exposed to ambient conditions between the heating zone and the mold unit during each molding cycle, and such exposure results in loss of precise control over the temperature of the web. The invention provides means for both protecting the next-to-be-molded portion of the web from such exposure and supplying heat thereto, so that, at the time of molding, the temperature of that portion of the web will be acceptably close to the predetermined temperature established in the heating zone.

---

This invention relates to improvements in apparatus for thermoforming polymeric sheet and particularly to the provision in such apparatus of means for at least minimizing cooling of the polymeric sheet when the apparatus is at a stage in its cycle of operation such that a portion of the polymeric sheet extends through a space between the sheet heating means and the mold unit.

Effective thermoforming of thermoplastic polymeric sheet, particularly foamed polystyrene, can be accomplished in a thermoforming apparatus in which the polymeric sheet is advanced continuously along a path of travel which passes through a heating zone and then through a molding zone, the apparatus including a mold unit comprising two mold assemblies disposed each on a different side of the sheet, the mold unit being driven rectilinearly to travel with the sheet from an initial location, which is adjacent the heating zone and in which the mold assemblies are closed on the polymeric sheet, to a second location, which is spaced from the heating zone and in which the mold assemblies are moved away from the sheet to retracted positions, the mold unit then being returned to the initial location. In operation of such an apparatus, a progressively increasing portion of the polymeric sheet is exposed between the heating zone and the mold unit as the mold unit advances toward its second location, this being the portion of the sheet which will be thermoformed in the next cycle of operation of the mold unit.

Particularly when thermoforming foamed polystyrene, it is of special importance to have the temperature of the sheet in a relatively narrow range as the sheet enters the molding zone. For this reason, the temperature imparted to the sheet in the heating zone is accurately predetermined, and loss of heat to the atmosphere from the portion of the sheet between the heating zone and the mold unit is a significant disadvantage, especially because this is a variable loss, depending on such uncontrolled environmental conditions as ambient temperature and air movement.

It is accordingly a general object of the invention to provide, in thermoformers of the general type described, means for at least minimizing the loss of heat from that progressively increasing portion of the polymeric sheet which extends from the heating zone to the mold unit as the mold unit advances toward its second location, at the end of the molding zone.

Another object is to provide means for minimizing exposure, of the portion of the sheet just mentioned, to ambient conditions.

A further object is to supply heat to the polymeric sheet as it advances away from the heating zone.

Generally stated, the improvements resulting from the invention are attained by equipping the mold assemblies of the thermoforming apparatus with heat storing and radiating devices which are dimensioned to extend over substantially the entire width of the polymeric sheet, which move with the mold assembly toward and away from the polymeric sheet, and are of such length, in the direction of travel of the sheet, as to at least substantially completely bridge the space between the heating zone and the mold unit when the mold unit is at the end of its travel away from the heating zone.

In order that the manner in which the foregoing and other objects are attained in accordance with the invention can be understood in detail, one particularly advantageous embodiment thereof will be described with reference to the accompanying drawings, which form a part of this specification, and wherein:

FIG. 2 is a side elevational view of a combination sheet guiding and heat storing and radiating device mounted on a thermoforming mold assembly according to the invention; and FIG. 3 is a plan elevational view of the sheet guiding and heat storing and radiating device of FIG. 2.

Figure 1:
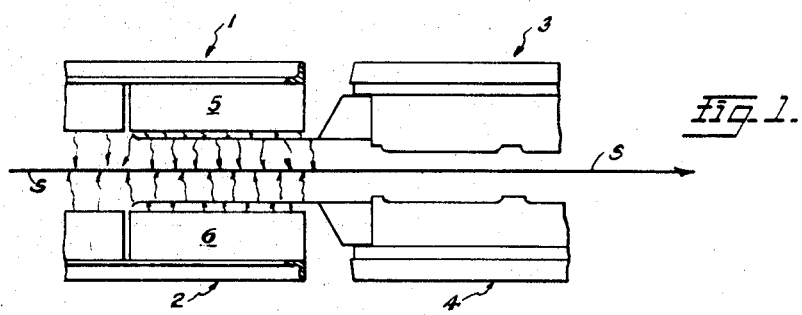
FIGS. 1–1C are semi-diagrammatic views illustrating sucessive positions of the mold assemblies relative to the heaters in a thermoforming apparatus embodying the invention.
Figure 1A:
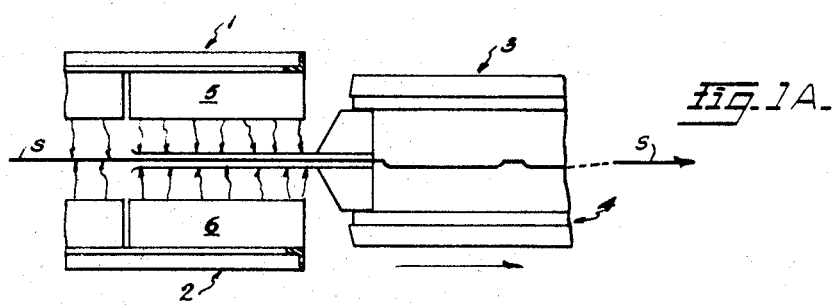
Figure 1B:
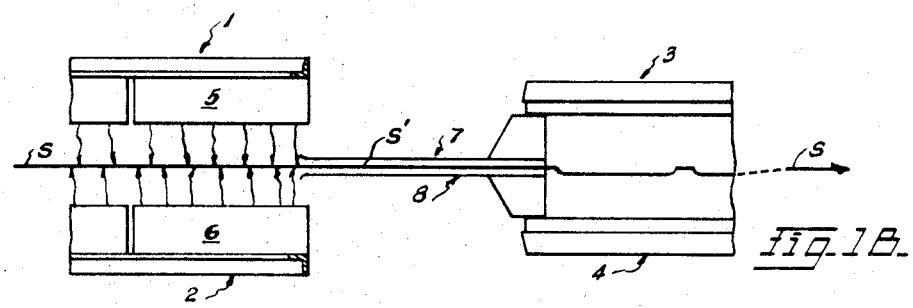
Figure 1C:
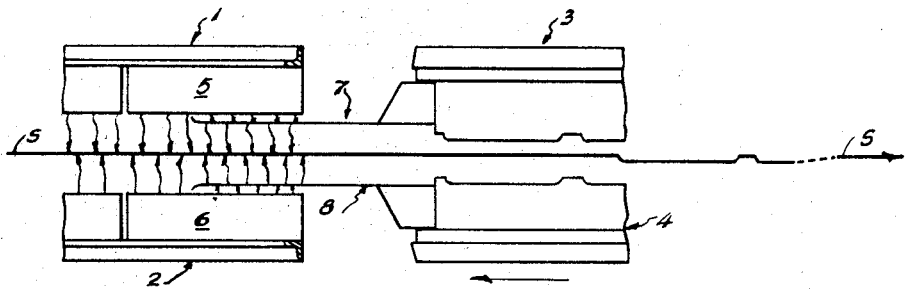

Referring now to the drawings in detail, FIGS. 1–1C illustrate the relative positions, at successive stages during one molding cycle, of the heating units 1, 2, the polymeric sheet S, and a mold unit comprising mold assemblies 3, 4 of a thermoforming apparatus so constructed that, once the mold assemblies 3, 4 have been closed on the sheet S, the mold unit is advanced with the sheet. Heating units 1, 2 can be considered as stationarily supported in the active positions shown, and comprise a plurality of heaters, includng heaters 5, 6 which are located at the end of the heating zone which is adjacent the molding zone. The heaters of the heating unit are operated continuously to supply heat directly to the polymeric sheet, which is advanced continuously. Heating unit 1 supplies heat to one side of sheet 8, while unit 2 supplies heat to the opposite side.

The mold assemblies 3, 4 are supported on a mold carriage (not shown) for movement at right angles to the plane of the polymeric sheet S, toward the sheet (for closing of the molds on the sheet) and away from the sheet (to allow the molded portion of the sheet to pass from the mold unit and the next successive portion of the sheet to be disposed in the mold unit). The mold carriage, and therefore the mold unit, are driven rectilinearly by a suitable drive (not shown) such as that disclosed in copending application filted concurrently herewith by Joseph C. Morin. So driven, the mold unit travels with the sheet S from an initial location, seen in FIG. 1A, to a second location, seen in FIG. 1B, the mold assemblies being closed on the sheet S throughout this portion of travel of the mold unit. With the mold unit at the second location seen in FIG. 1B, mold assemblies are moved away from the sheet S into inactive positions and the mold unit is returned to its initial location, as will be clear from comparison of FIGS. 1B, 1C, 1 and 1A, the cycle of operation then being repeated. In its advance from the first location to the second location, the mold unit is driven at precisely the same speed as is the sheet S, typically 15–50 feet per minute. Return of the mold unit to its initial location is at a more rapid rate, to minimize the amount of polymeric sheet which travels through the machine between the successive molding operations.

During each actual molding operation, in which the mold unit advances from its initial location to its second location, a portion of polymeric sheet S′, FIG. 1B, is present between the heating zone and the mold unit. To protect sheet portion S′ from exposure to ambient conditions, and to supply heat to this portion of the sheet during its residence between the heating zone and the mold unit, the mold assemblies 3, 4 are respectively equipped with heat storing and radiation devices 7, 8.

Each mold assembly comprises a platen 9, a mold 10, and clamp bars 11 employed to rigidly secure the mold to the platen. Each radiating device 7, 8 comprises a flat aluminum sheet 12, FIGS. 2 and 3, bent at right angles along line 13 to provide a mounting flange 14. The main body 15 of sheet 12 has an edge 16, opposite flange 14, which is bent generally cylindrically out of the plane of the body 15 of the sheet, in the same direction as flange 14.

Sheet 12 is relatively thin, typically 12 ga., and is secured, as by rivets, to a supporting frame comprising side members 17 and cross members 18, lying in contact with body 15, uprights 19 lying in contact with flange 14, a mounting bar 20 secured to the ends of the upright which are opposite body 15 of sheet 12, and braces 21 slanting from bar 20 to side members 17. The frame members are secured together, as by welding, to constitute a rigid frame structure.

Each device 7, 8 is secured rigidly to its respective mold assembly 3, 4 by bolts 22 which extend through openings in the bar 20 and through aligned bores in the respective mold clamping bar 11. With the devices 7, 8, thus secured, flanges 14 lie against the corresponding side face of the respective mold 10, and the body portions 15 of sheets 12 project away from the molds in such fashion as to be mutually parallel, and parallel to the polymeric sheet S, when the mold unit is properly assembled in the thermoforming apparatus. The devices 7, 8 are secured to the sides of the mold which face toward the heating zone. The space between mounting bars 20 and the body portions 15 is such that, when the mold assemblies are in their retracted positions (seen in FIG. 1) and the mold unit is at its first location (as in FIG. 1) the body portions 15 extend respectively adjacent and parallel to the faces of heaters 5, 6 which are directed toward the polymeric sheet S and, when the mold assemblies are closed on the polymeric sheet, the body portions are immediately adjacent but spaced from the polymeric sheet. As will be clear from a comparison of FIGS. 1 and 1B, the length of the body portions 15 of sheets 13 is such that the body portions completely bridge the space between the molds 10 and the heaters 5, 6 when the mold unit is in its second position, seen in FIG. 1B. The width of the body portions 15, that is, the dimension transverse to the path of travel of sheet S, is such that the body portions 15 overlie substantially all of the width of the polymeric sheet S between the feed devices (not shown) which engage the edge portions of the sheet to feed the sheet along its path of travel. Accordingly, the body portions 15 of sheets 13 are adjacent to and overlie substantially all of the portion S′ of the polymeric sheet.

When the mold unit is in its initial location, so that the major portion of devices 7, 8 extend into the space between heaters 5, 6, the heat supplied by these heaters is applied directly to sheets 13 and some of this heat is radiated to the sheet S, this being true both when the devices 7, 8 are adjacent the heaters (FIG. 1) and when these devices are adjacent the sheet S (FIG. 1A).

As the mold unit, with the molds 10 having been closed on the polymeric sheet S, advances toward its second location, with the devices 7, 8 moving with the mold unit in trailing relation, heat stored in the devices 7, 8 is radiated to the portion S′ of the polymeric sheet. Further, the devices 7, 8, acting to mask the portion S′, both reduce radiant heat loss from that portion and prevent that portion from being exposed to contact with cool ambient air. Accordingly, when the mold unit has been returned to its initial position and the molds are again closed on the polymeric sheet, the sheet is still substantially at or very near the predetermined temperature imparted thereto by the heaters in the heating zone.

While one particularly advantageous embodiment of the invention has been chosen for illustrative purposes, it will be understood that various changes and modifications can be made therein without departing from the scope of the invention as defined in the appended claims.

What is claimed is:

1. In a thermoforming apparatus of the type in which polymeric sheet to be thermoformed is advanced continuously along a path which passes through a heating zone and then through a molding zone, the heating zone being equipped with two heaters each located on a different side of the polymeric sheet as the sheet passes through the heating zone and each having an end portion adjacent the molding zone, the apparatus being equipped with a mold unit including two mold assemblies which are disposed each on a different side of the sheet as the sheet passes through the molding zone, the mold unit being driven rectilinearly to travel with the sheet from an initial location, which is adjacent the heating zone and in which the mold assemblies are closed on the sheet, to a second location, which is spaced from the heating zone by a distance at least equal to the width of the mold assemblies in the direction of travel of the sheet and in which the mold assemblies are moved to retracted positions spaced from the sheet, the mold unit then returning to the initial location with the mold assemblies remaining spaced from the sheet, the combination of two flat members of material capable of conducting heat,
one of said flat members being mounted on one of the mold assemblies,
the other of said flat members being mounted on the other of the mold assemblies,
said flat members having a width, transverse to the direction of travel of the polymeric sheet, which at least approximates the width of the area of the polymeric sheet heated by the heaters, the length of said flat members, in the direction of travel of the polymeric sheet, being at least substantially as great as the distance between the end portions of the heaters and the molding unit when the latter is in its second location,
said flat members projecting from the mold assemblies toward the heating zone and being mutually parallel and parallel to the path of travel of the polymeric sheet,
said flat members being so positioned on the respective mold assemblies that said flat members are adjacent the polymeric sheet when the mold assemblies are closed thereon, and adjacent the respective heaters when the mold assemblies are in their retracted positions and the mold unit is in its initial location,
said flat members being heated by the heaters during a time period commencing with entry of said flat members into the heating zone as the mold unit is returned to its initial location and terminating with removal of said flat members from the heating zone as the mold unit advances with the polymeric sheet toward the second location,
heat being radiated from said flat members to the adjacent portion of the polymeric sheet during advance of the mold unit to its second location, whereby the portion of the sheet between the heating zone and the mold unit is prevented from cooling excessively.

2. A thermoforming apparatus according to claim 1, wherein
said flat members are thin metal sheets,
the apparatus further comprising rigid supporting structures to which said thin metal sheets are respectively affixed.

3. A thermoforming apparatus according to claim 2, wherein
said supporting structures are located respectively on the sides of said thin metal sheets which are directed away from the polymeric sheet.

4. A thermoforming apparatus according to claim 1, wherein
the edges of said flat members which are spaced from the mold unit are curved away from the path of travel of the polymeric sheet to constitute guide surfaces for the polymeric sheet.

5. In a thermoforming apparatus of the type including means for advancing a polymeric sheet first through a heating zone and then through a molding zone, two heaters located in the heating zone and having operative positions respectively adjacent the opposite sides of the polymeric sheet when the polymeric sheet is within the heating zone, and a mold unit including two mold assemblies opposed across the thickness of the sheet, the mold unit being driven rectilinearly to advance with the polymeric sheet from an initial location, which is adjacent the heating zone and in which the mold assemblies are closed on the sheet, to a second location at which the mold assemblies are moved away from the sheet to retracted positions, the mold unit being then returned to the initial location, the combination of
heat storing and radiating means mounted on the mold unit and arranged to project into the heating zone so as to be interposed between the polymeric sheet and both of the heaters when the mold unit is in its initial location,
said heat storing and radiating means being dimensioned to at least substantially completely overlap that portion of the polymeric sheet extending between the heating zone and the mold unit throughout the entire time of travel of the mold unit to its second location.

References Cited
UNITED STATES PATENTS

| | | |
|---|---|---|
| 2,967,328 | 1/1961 | Shelby et al. |
| 3,193,881 | 7/1965 | Kostur. |
| 3,362,045 | 1/1968 | Jone-Hinton et al. |
| 3,398,434 | 8/1968 | Alesi et al. |

WILLIAM J. STEPHENSON, Primary Examiner